United States Patent
Seltzer et al.

(10) Patent No.: US 10,970,446 B1
(45) Date of Patent: Apr. 6, 2021

(54) AUTOMATED PIPELINE INSERTION ON A BUS

(71) Applicant: Xilinx, Inc., San Jose, CA (US)

(72) Inventors: Jeffrey H. Seltzer, Los Gatos, CA (US); Khang K. Dao, San Jose, CA (US); Sabyasachi Das, San Jose, CA (US)

(73) Assignee: XLNX, INC., San Jose, CA (US)

( * ) Notice: Subject to any disclaimer, the term of this patent is extended or adjusted under 35 U.S.C. 154(b) by 253 days.

(21) Appl. No.: 15/988,448

(22) Filed: May 24, 2018

(51) Int. Cl.
*G06F 30/3312* (2020.01)
*G06F 30/34* (2020.01)
*G06F 30/327* (2020.01)
*G06F 30/392* (2020.01)
*G06F 30/394* (2020.01)
*G06F 30/398* (2020.01)
*G06F 119/12* (2020.01)

(52) U.S. Cl.
CPC ........ *G06F 30/3312* (2020.01); *G06F 30/327* (2020.01); *G06F 30/34* (2020.01); *G06F 30/392* (2020.01); *G06F 30/394* (2020.01); *G06F 30/398* (2020.01); *G06F 2119/12* (2020.01)

(58) Field of Classification Search
CPC .... G06F 30/327; G06F 30/3312; G06F 30/34; G06F 30/392; G06F 30/394; G06F 30/398; G06F 2119/12
See application file for complete search history.

(56) References Cited

U.S. PATENT DOCUMENTS

| 8,028,260 | B1* | 9/2011 | Ravi | G06F 30/3312 716/113 |
| 2001/0010090 | A1* | 7/2001 | Boyle | G06F 30/39 716/105 |
| 2002/0178285 | A1* | 11/2002 | Donaldson | G06F 30/30 709/237 |
| 2005/0055655 | A1* | 3/2005 | Augsburg | G06F 30/30 716/113 |
| 2011/0204932 | A1* | 8/2011 | Cortadella | G06F 7/00 327/145 |
| 2015/0121319 | A1* | 4/2015 | Hutton | G06F 30/327 716/101 |

OTHER PUBLICATIONS

ARM, "AXI Register Slice Cycle Model Version 9.0.0 User Guide," Nov. 2016, pp. 1-23, ARM Limited, Cambridge, England.

* cited by examiner

*Primary Examiner* — Jack Chiang
*Assistant Examiner* — Aric Lin
(74) *Attorney, Agent, or Firm* — Crawford Maunu PLLC (57) ABSTRACT

The disclosed approaches process a circuit design having first attributes associated with two or more signals or with sources of the two or more signals. The first attributes specify identifier values. The elements of the circuit design are placed on a target integrated circuit (IC), and timing analysis of the circuit design is performed after placing the elements of the circuit design. In response to the first attributes of the two or more signals or sources specifying equivalent identifier values and a path of at least one of the two or more signals or sources being timing-critical, equal numbers of one or more pipeline registers are inserted on paths of the two or more signals or sources.

11 Claims, 5 Drawing Sheets

AUTOMATED PIPELINE INSERTION ON A BUS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The disclosure generally relates to resolving timing issues in circuit designs.

BACKGROUND

Bus protocol standards, such as AXI, are widely used to facilitate the system design process. Such bus protocol standards can provide a "plug-and-play" benefit across a catalog of circuit designs (also "logic cores"). However, routing distances and congestion can force designers to pipeline signal pathways to achieve performance requirements. For example, to satisfy setup and hold time requirements, a circuit designer may insert pipeline registers on certain signal paths.

Resolving timing issues involving bus protocol standards can be challenging. Bus-protocol pathways cannot be pipelined by simply inserting pipeline registers, because of two-way handshake signals. Some implementations of bus protocols provide "register slices" for storing and forwarding protocol signals properly. Pre-designed logic blocks can contain register slices having pipeline depths that can be selected by the system designer in early stages of design preparation. Choosing the optimal pipeline depth can be challenging depending on the system logic complexity and target technology.

The designer may estimate the initial pipeline depth based on trade-offs between clock frequency versus both area and latency. The pipelining depth of register slices could be adjusted based on place-and-route results indicating timing failures and high utilization, for example. However, such adjustments require system designers to know how to interpret the details of the place-and-route results and how to correlate the details back to the available pipelining controls. Relating details of the place-and-route results back to the available pipelining controls makes timing closure challenging and prolongs the overall design process.

SUMMARY

A disclosed method includes inputting to a programmed processor, a circuit design having first attributes associated with two or more signals or with sources of the two or more signals. The first attributes specify identifier values. The programmed processor places elements of the circuit design on a target integrated circuit (IC) and performs timing analysis of the circuit design after placing the elements of the circuit design. In response to the first attributes of the two or more signals or sources specifying equivalent identifier values and a path of at least one of the two or more signals or sources being timing-critical, by the programmed processor inserts equal numbers of one or more pipeline registers on paths of the two or more signals or sources.

A disclosed system includes a computer processor and a memory coupled to the computer processor. The memory is configured with instructions that when executed cause the computer processor input a circuit design having first attributes associated with two or more signals or with sources of the two or more signals. The first attributes specify identifier values. The instructions further cause the computer processor to place elements of the circuit design on a target integrated circuit (IC) and perform timing analysis of the circuit design after placing the elements of the circuit design. In response to the first attributes of the two or more signals or sources specifying equivalent identifier values and a path of at least one of the two or more signals or sources being timing-critical, the computer processor inserts equal numbers of one or more pipeline registers on paths of the two or more signals or sources.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed methods and systems allow logic core designers to decompose their bus-protocol pathways into signal pathways that are amenable to automated pipelining to depths that are correlated to place-and-route results. Essential relationships among the bus handshake signals can be specified in the circuit design so that the place-and-route algorithm can automatically insert pipeline registers while maintaining functionally correct behavior. The place-and-route algorithm optimizes the pipeline depth during run-time to achieve the system designer's timing constraints with minimal logic utilization. Supporting a wide range of pipeline depths becomes more critical when physical routing distances grow as a result of using recent technologies like Stacked-Silicon Interconnect (SSI).

The disclosed approaches are applicable to circuit designs in which handshake signals are used in facilitating communication of data signals between modules. A circuit design can specify attributes associated with selected data signals or sources of the data signals, and specify attributes associated with handshake signals or sources of the handshake signals. The attributes can indicate to a circuit design tool which handshake signals are used in controlling which data signals. That is, certain handshake signals (or sources) can be associated with certain data signals (or sources). After placing elements of the circuit design, timing analysis of the placed circuit design can indicate one or more of the data signals/sources and/or associated handshake signals are on timing-critical paths. Timing-critical paths are those having setup or hold time violations.

Upon finding a timing-critical path, the circuit design tool determines whether the circuit design has specified attributes that indicate associations between the signal/source of the timing critical path and other signal/sources. For example, if the timing-critical path involves a data signal/source, the circuit design tool determines whether an attribute of the data signal/source and an attribute of a handshake signal/source indicate that the data signal/source and the handshake signal/source are in the same group. In response to attributes of the data signal/source and the handshake signal/source indicating that the signals/sources are in the same group, the circuit design tool inserts pipeline registers on both the path of the data signal/source and on the path of the handshake signal/source. In order to maintain proper cycle timing between related data and handshake signals, the circuit design tool inserts equal numbers of pipeline registers on the data path and handshake path.

Figure 1:
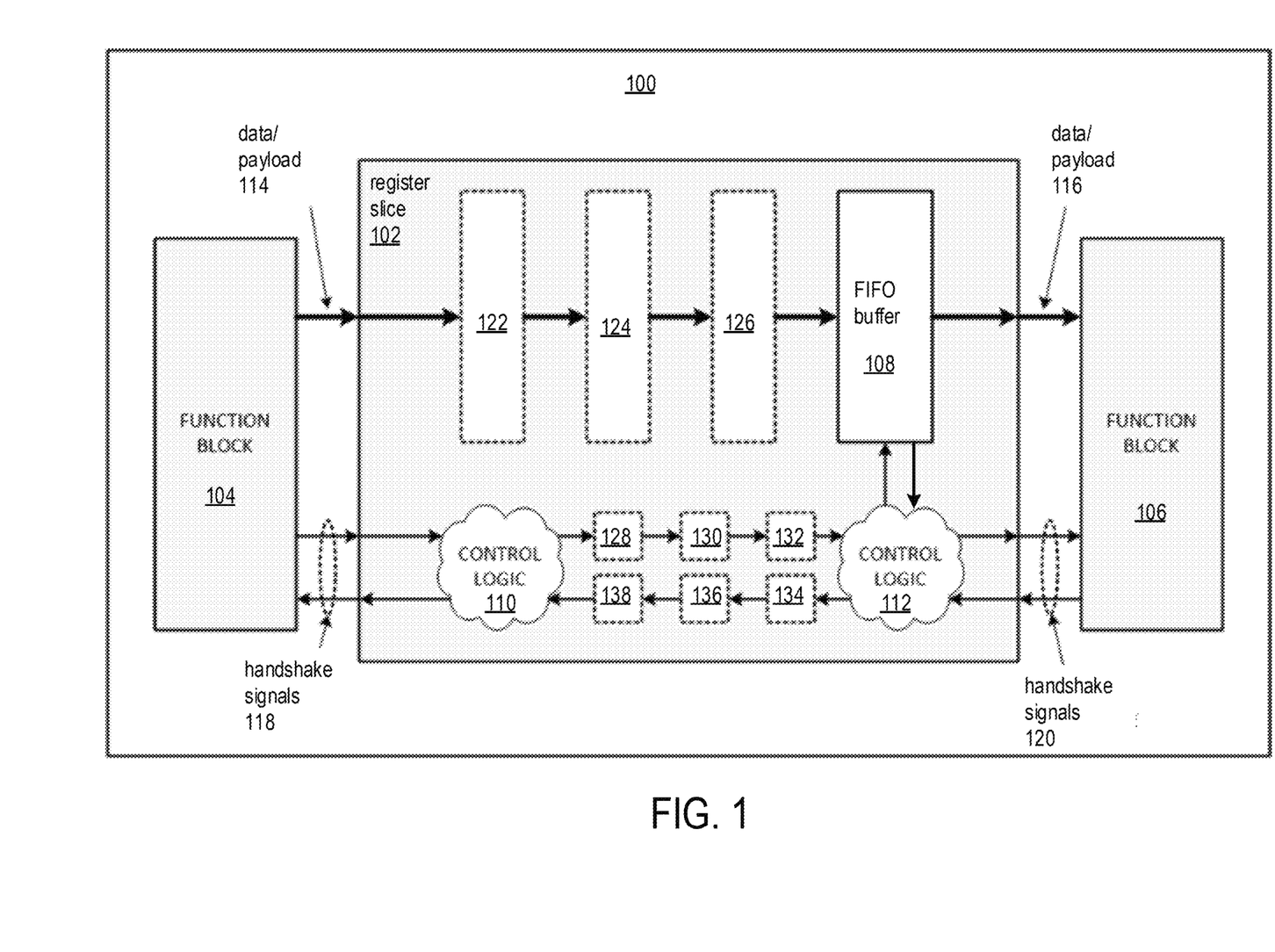
FIG. 1 shows a circuit design having an exemplary register slice connected between a function block and a function block according to a prior approach.

FIG. 1 shows a circuit design 100 having an exemplary register slice 102 connected between a function block 104 and a function block 106 according to a prior approach. An example of function block 104 is a master circuit, such as a microprocessor, and an example of a function block 106 is a slave circuit, such as a memory or input/output device. The register slice can be provided as part of a bus module from a library of logic cores. For example, the register slice can be an Advanced eXtensible Interface (AXI) register slice carrying one channel of a memory-mapped AXI interface, such as the write data channel of an AXI4 interface, as shown in FIG. 1. Though only one register slice is shown, it will be recognized that another register slice can be instantiated between the function block 106 and the function block 104 for carrying data from function block 106 to function block 104. For example, the second register slice can be another AXI register slice carrying the read data channel of the AXI4 interface.

The register slice 102 includes a data path and a handshake path that connect the function block 104 to the function block 106. Function block 104 is connected to the data path of the register slice 102 by signal lines 114, and function block 106 is connected to the data path of the register slice 102 by signal lines 116. Function block 104 is connected to the handshake path of the register slice by signal lines 118, and function block 106 is connected to the handshake path of the register slice by signal lines 120. The handshake signals can include valid and read signals, for example.

The data path includes FIFO buffer 108, and the handshake path includes control logic 110 that interfaces with the function block 104 and control logic 112 that interfaces with the function block 106.

At the time a circuit design is created, the designer can specify the depth of the pipeline in the register slice 102. The pipeline registers are shown as blocks outlined by dashed lines. The pipeline registers on the data path are shown as blocks 122, 124, and 126. The pipeline registers on the handshake path from the function block 104 to the function block 106 are shown as blocks 128, 130, and 132, and pipeline registers on the handshake path from the function block 106 to the function block 104 are shown as blocks 134, 136, and 138. Though three pipeline registers are shown on each path, the number of pipeline registers is an option that can be configured by the circuit designer at the time the system is coded in a hardware description language (HDL). Equal numbers of pipeline registers are present in the data path and in the handshake path from block 104 to block 106 in order to preserve proper cycle timing relationship.

Control logic 110 outputs a handshake signal to register 128 which is asserted only when both of 2 conditions are satisfied: the handshake received from register 138 is asserted AND the handshake received from function block 104 is asserted. Control logic 110 also outputs a handshake signal to function block 104 which is asserted whenever the handshake received from register 138 is asserted.

Control logic 112 outputs a handshake signal to register 134 which is asserted when either of two conditions are satisfied: the status signal received from FIFO buffer 108 indicates that the FIFO is empty OR the handshake received from function block 106 is asserted. Control logic 112 also outputs a handshake signal to function block 106 which is asserted whenever the status signal received from FIFO buffer 108 indicates that the FIFO is not empty. Control logic 112 also outputs a PUSH control signal to FIFO buffer 108 that is asserted whenever the handshake signal received from register 132 is asserted. Control logic 112 also outputs a POP control signal to FIFO buffer 108 that is asserted when both of two conditions are satisfied: the handshake signal received from function block 106 is asserted and the status signal received from FIFO buffer 108 indicates that the FIFO is not empty.

Figure 2:
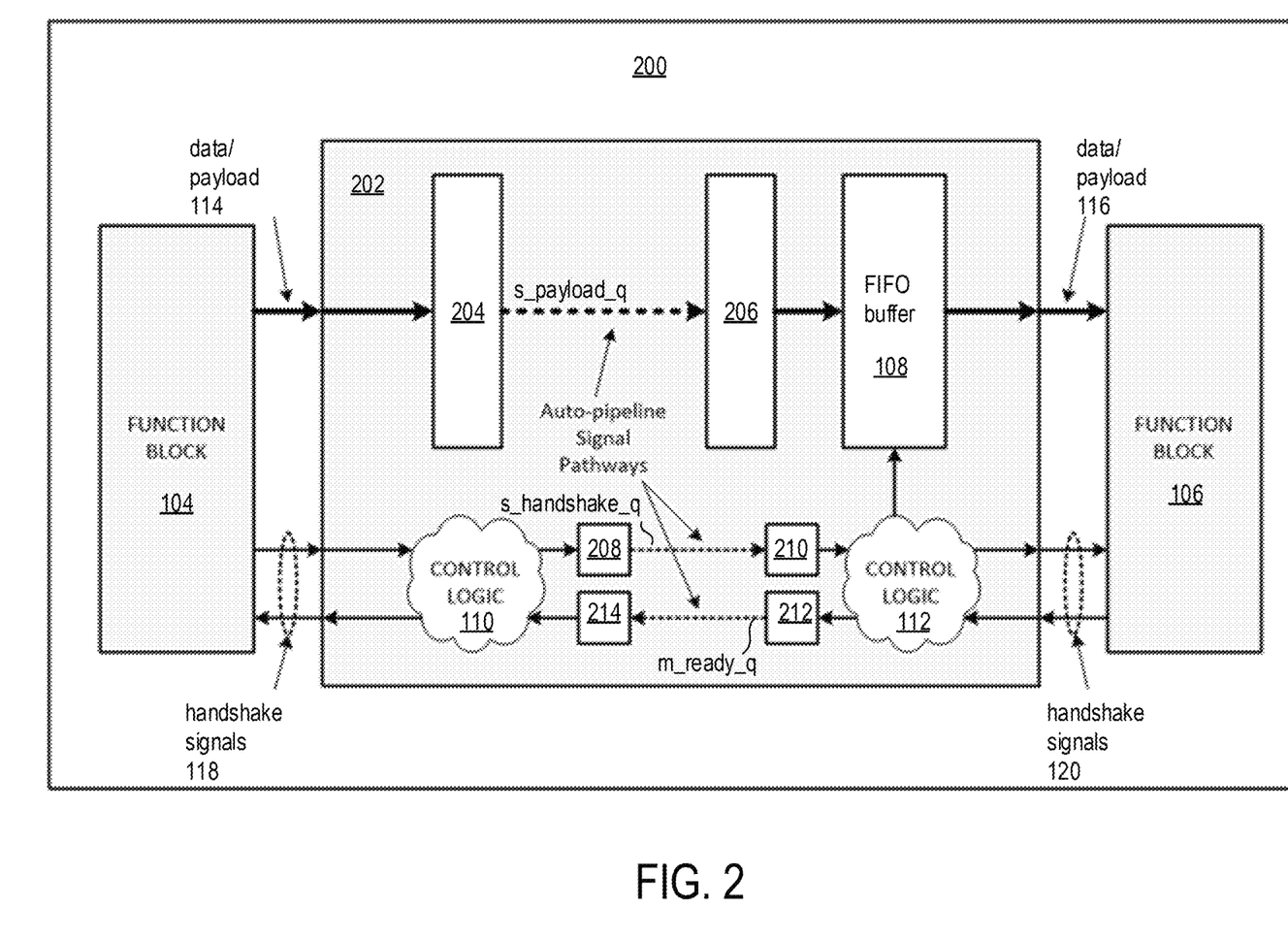
FIG. 2 shows a circuit design having a module that connects function block to function block via a data path and handshake paths.

FIG. 2 shows a circuit design 200 having a module 202 that connects function block 104 to function block 106 via a data path and handshake paths. The data signal(s)/source(s) and handshake signals/sources have associated attributes that a circuit design tool can use to automatically insert pipeline registers in timing-critical paths without disrupting the cycle timing relationships among the signal pathways that are required for proper functional behavior of the protocol-compliant interfaces of the register slice block.

Module 202 is similar to the register slice 102, but has data and handshake signals annotated with signal attributes to allow automatic insertion of pipeline registers. The data path includes an input register 204 and an output register 206. Each of the handshake paths includes an input register and an output register. The handshake path from function block 104 to function block 106 has input register 208 and output register 210, and the handshake path from function block 106 to function block 104 has input register 212 and output register 214.

In response to finding that the data path from register 204 to register 206 is timing-critical, a circuit design tool can automatically insert one or more pipeline registers between input register 204 and output register 206. Similarly, in response to finding that the handshake path from register 208 to register 210 is timing-critical, a circuit design tool can automatically insert one or more pipeline registers between input register 208 and output register 210. In response to further finding that the signal attributes applied to the data path from register 204 to register 206 and the signal attributes applied to the handshake path from register 208 to register 210 indicate that both signal paths belong to the same pipelining group, the same number of pipeline registers are inserted on the handshake path between input register 208 and output register 210 as are inserted on the data path between input register 204 and output register 206, in order to avoid disrupting the required cycle timing relationship between the paths.

In response to finding that the handshake path between input register 212 and output register 214 is timing-critical, a circuit design tool can automatically insert one or more pipeline registers between input register 212 and output register 214.

Figure 3:
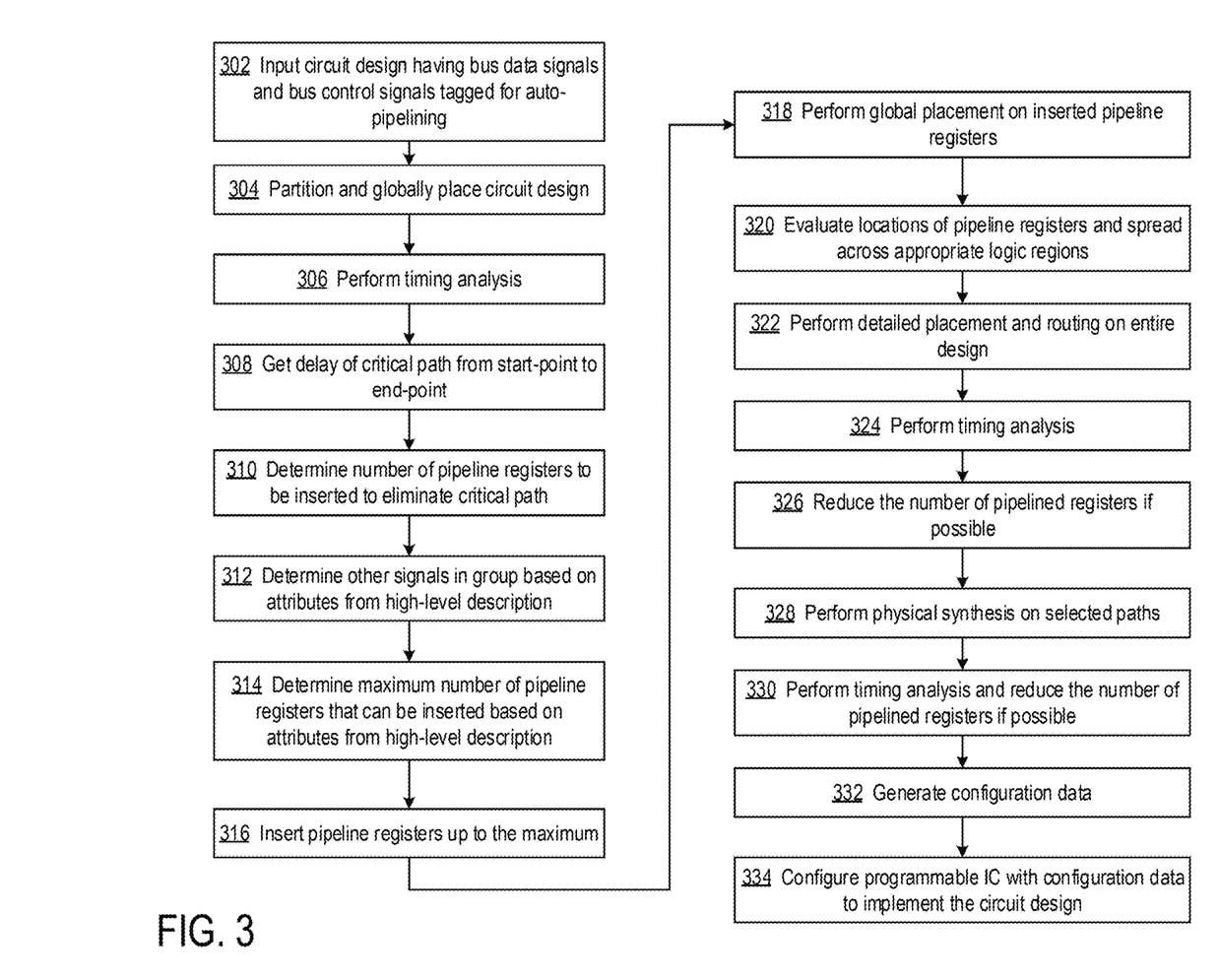
FIG. 3 is a flow diagram of a process that automatically inserts pipeline registers in response to finding timing-critical paths.

FIG. 3 is a flow diagram of a process that automatically inserts pipeline registers in response to finding timing-critical paths. The process is guided by the attributes that indicate related groups of signals/sources in the circuit design. At block 302, the circuit design tool inputs a circuit design. The circuit design has signals/sources tagged for auto-pipelining. In an exemplary implementation, the tagging of the signals/sources specify the attributes that group signals/sources for auto-pipelining.

The HDL code in Example 1 (below) shows a detailed, exemplary solution to the module 202 of FIG. 2. Registered signal s_payload_q represents the output of block 204, signal s_handshake_q represents the output of block 208, and signal m_ready_q represents the output of block 212. These data and handshake signals are tagged with attributes used to indicate to the circuit design tool signals/sources related for automatic insertion of pipeline registers. The registers s_handshake_q, s_payload_q, and m_ready_q are tagged with attributes by way of compiler directives, for example. Register s_handshake_q is tagged with the following attributes: autopipeline_group="fwd", autopipeline_limit=28, and autopipeline_include="resp." Register s_payload_q is tagged with the following attributes: autopipeline_group="fwd", autopipeline_limit=28, and autopipeline_include="resp," and Register m_ready_q is tagged with the attribute, autopipeline_group="resp."

The attribute autopipeline_group is used to associate signals/sources by group. Signals/sources having the same value for the attribute belong to the same group. If the signal/source is found to be on a timing-critical path and that signal/source has an autopipeline_group attribute, then the circuit design tool uses the value of the attribute to determine other signals/sources belonging to the same group. In the exemplary HDL code, the registers s_handshake_q and s_payload_q are tagged with the group value "fwd." The circuit design tool can insert equal numbers of pipeline registers on the paths having the signals/sources that belong to the same group.

```
//copyright 2018 XILINX, INC.
module axi_register_slice_auto_pipeline
  (
    input wire ACLK,
    input wire ARESETN,
    input wire [C_DATA_WIDTH-1:0] S_PAYLOAD_DATA,
    input wire S_VALID,
    output reg S_READY,
    output wire [C_DATA_WIDTH-1:0] M_PAYLOAD_DATA,
    output wire M_VALID,
    input wire M_READY
  ) ;
// All signals tagged with "autopipeline_group=fwd" must get
//    the same pipelining depth.
//All signals tagged with "autopipeline_group=resp" must get
//    the same pipelining depth.
//The pipelining depth of signals with "autopipeline_group=fwd"
```

-continued

```
//    plus the depth of "autopipeline_group=resp"
//    must not exceed 28 (worst-case round-trip latency)
  (* autopipeline_group="fwd",
     autopipeline_limit=28,
     autopipeline_include="resp" *) reg s_handshake_q;
  (* autopipeline_group="fwd",
     autopipeline_limit=28,
     autopipeline_include="resp" *)
     reg [C_DATA_WIDTH-1:0] s_payload_q;
  (* autopipeline_group="resp" *) reg m_ready_q;
  always @(posedge ACLK) begin
    if (~ARESETN) begin
       s_handshake_q <= 1'b0;
       m_ready_q    <= 1'b0;
       S_READY      <= 1'b0;
    end else begin
       s_handshake_q <= S_VALID & S_READY;
       m_ready_q    <= M_READY | ~M_VALID;
       S_READY      <= s_ready_q;
    end
  end
  always @(posedge ACLK) begin
    s_payload_q    <= S_PAYLOAD_DATA;
    m_payload_q    <= s_payload_q;     // Auto-pipeline
    m_handshake_q  <= s_handshake_q;   // Auto-pipeline
    s_ready_q      <= m_ready_q;       // Auto-pipeline
  end
  assign pop = M_READY & M_VALID;
  axi _fifo_32deep
    fifo_0
    (
      .ACLK           (ACLK),
      .ARESETN        (ARESETN),
      .S_PAYLOAD_DATA (m_payl oad_q) ,
      .S_VALID        (m_handshake_q) ,
      .M_PAYLOAD_DATA (M_PAYLOAD_DATA) ,
      .M_VALID        (M_VALID) ,
      .M_READY        (pop)
    ) ;
endmodule
```

Example 1

At block 304, the circuit design tool partitions and globally places the circuit design. Partitioning can entail dividing a netlist of the circuit into smaller netlists such that interconnection between partitions is minimized. In globally placing the circuit design, the partitions are assigned to regions of a target integrated circuit device. At block 306, the circuit design tool performs timing analysis on the globally placed circuit design and identifies any timing-critical paths based on the global placement.

The processing of blocks 308-316 can be performed for each of the timing-critical paths discovered in timing analysis. At block 308, the circuit design tool determines the total delay of the timing-critical path from the start-point of the path to the end-point of the path, and determines the number of pipeline registers needed to resolve the timing issue. At block 312, the circuit design tool determines other signals/sources of the circuit design that are associated with the timing-critical path. The associated signals/sources can be determined based on the values assigned to attributes of the signals/sources. If, for example, the circuit design tool determines from a circuit design having the register slice of Example 1, that the path originating at the output of register s_payload_q [7] (bit 7 of the payload register) is timing critical, then all remaining bit positions of s_payload_q and the register s_handshake_q are determined to be in the same group because they are all tagged with the attribute autopipeline_group="fwd." Consequently, all signal paths in the group tagged with attribute autopipeline_group="fwd" are required to have an equal number of pipeline registers inserted.

At block 314, the circuit design tool determines the maximum number of pipeline registers that can be inserted based on attributes associated with the timing-critical paths. In an exemplary implementation, the attributes on a timing-critical path or a path associated by group specify the total number of a pipeline registers that can be inserted on round-trip paths, one or more of which is a timing-critical path. In the exemplary register slice of Example 1, the group of signals tagged with attribute autopipeline_group="fwd" are also tagged with the attribute autopipeline_limit=28, indicating that the maximum pipeline limit of 28 registers is associated with the signal group "fwd". The group of signals tagged with attribute "autopipeline_group=fwd" are further tagged with the attribute autopipeline_include="resp", indicating that the maximum pipeline limit of 28 registers is to be applied to the total pipeline depth of both group "fwd" and group "resp". That is, the pipelining depth of paths having the attribute autopipeline_group="fwd" plus the depth of autopipeline_group="resp" cannot exceed 28, which is a worst-case round-trip latency. Referring to the exemplary module 202 of FIG. 2, if some number x of pipeline registers are inserted on the paths between input register 204 and output register 206, which are members of group "fwd", then the same number x of pipeline registers are also inserted between input register 208 and output register 210, a pathway that is also a member of group "fwd". If some number y of pipeline registers are inserted between input register 212 and output register 214, a pathway that is a member of group "resp", then total number of pipeline registers x+y shall not exceed the maximum limit of 28 pipeline registers, as specified by the attribute autopipeline_limit=28.

At block 316, the circuit design tool inserts a number of registers on the timing-critical path and on the paths that are associated with the timing-critical path by the group attribute value. The circuit design tool determines the number of pipeline registers to insert based on the delay determined for the timing-critical path and the delay needed to resolve the timing violation. The number of pipeline registers inserted is limited by the maximum number specified by the attributes associated with the path.

The functional behavior provided by the handshake signals is maintained, even with insertion of the pipeline registers in the handshake paths, by way of logically decomposing the AXI handshake signals at the boundary of the exemplary register slice module into an alternative set of internal handshake signals that can withstand an arbitrary amount of pipelining. In the HDL code of Example 1, the value stored in register s_handshake_q is based on the input signal S_VALID and the output register S_READY, which is expressed as, s_handshake_q<=S_VALID & S_READY. Also, the value stored in the register m_ready_q is based on the input signal M_READY and the output signal M_VALID, which is expressed as, m_ready_q<=M_READY|~M_VALID.

At block 318, the circuit design tool performs global placement of the inserted pipeline registers, and at block 320, the circuit design tool evaluates locations of the inserted pipeline registers and spreads the pipeline registers across the assigned regions to avoid congestion. The circuit design tool performs detailed placement and routing of the entire circuit design at block 322, whereby elements of the circuit design are assigned to specific circuit resources of the target device and signals area assigned to specific signal routes on the target device. At block 324, the circuit design tool performs timing analysis on the placed-and-routed circuit design.

In response to the timing analysis revealing hold slack on paths to which pipeline registers were added, at block 326 the circuit design tool can optionally reduce the number of pipelined registers on those paths by removing one or more of the pipeline registers from the paths. The number of pipeline registers removed depends on the amount of hold slack available. In removing the pipeline registers, the circuit design tool repeats the detailed routing of the circuit design performed at block 322.

At block 328, the circuit design tool performs physical synthesis on selected timing-critical paths of the circuit design. The physical synthesis can involve netlist changes and/or placement changes that fix or reduce timing problems. At block 330 the circuit design tool performs timing analysis on the physically synthesized circuit design. In response to the timing analysis revealing hold slack on paths to which pipeline registers were added, the circuit design tool can reduce the number of pipelined registers on those paths by removing one or more of the pipeline registers from the paths. The number of pipeline registers removed depends on the amount of hold slack available. In removing the pipeline registers, the circuit design tool repeats the detailed routing of the circuit design performed at block 322.

At block 332, configuration data is generated from the fully placed-and-routed circuit design. For example, bitstream generation tools may be executed to generate configuration data for an FPGA. At block 334, a programmable IC may be configured with the configuration data, thereby creating a circuit that operates according to the circuit design as modified to include replacement memory blocks in place of groups of candidate memory blocks. In other applications and implementations, the generated configuration data can be used to realize the circuit design in an application specific integrated circuit (ASIC).

Figure 4:
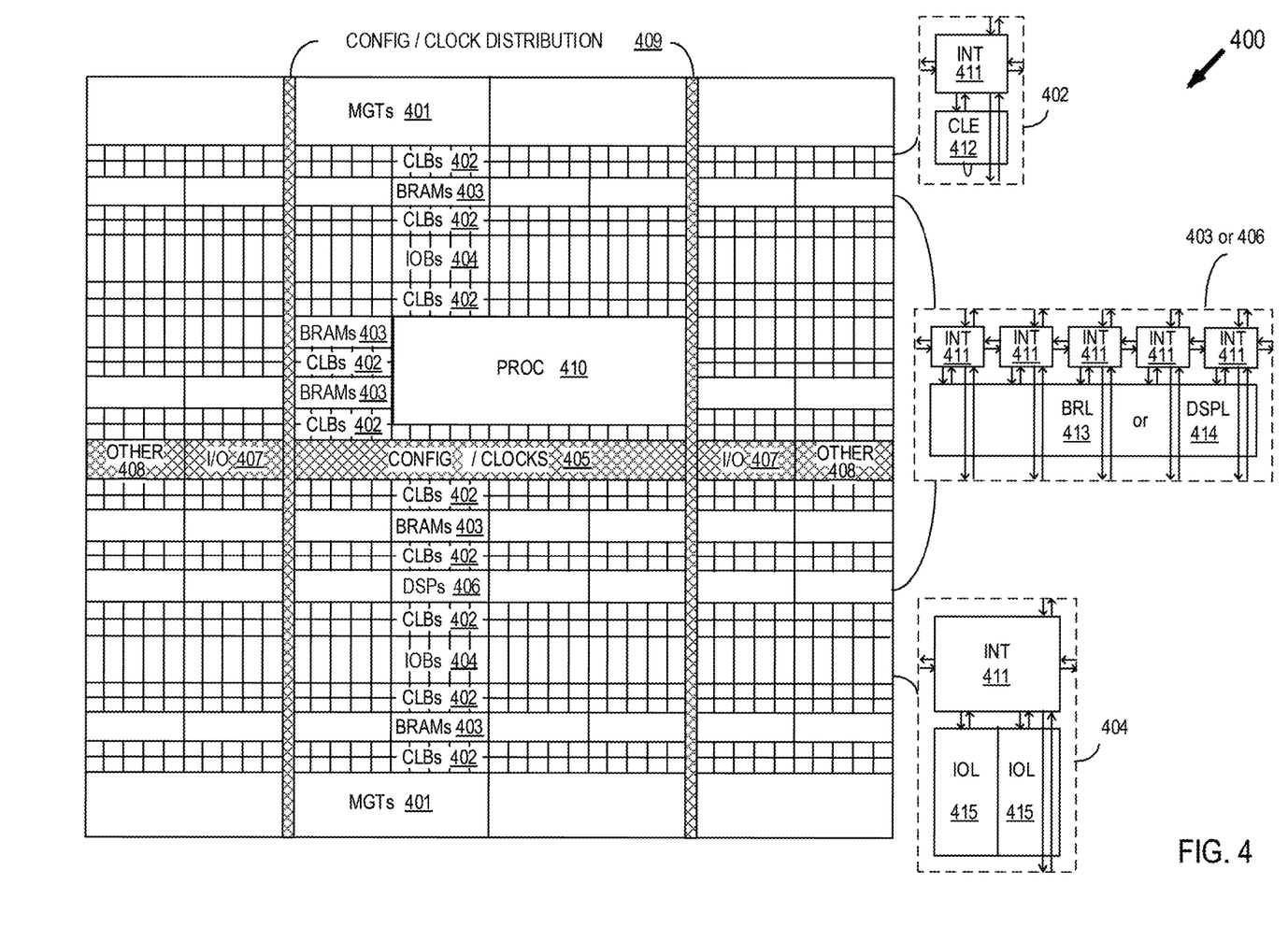
FIG. 4 shows a programmable integrated circuit (IC) that can be a target device on which a circuit design having the disclosed pipelined data paths and handshake paths can be implemented.

FIG. 4 shows a programmable integrated circuit (IC) 400 that can be a target device on which a circuit design having the disclosed pipelined data paths and handshake paths can be implemented. The programmable IC may also be referred to as a System On Chip (SOC) that includes field programmable gate array logic (FPGA) along with other programmable resources. FPGA logic may include several different types of programmable logic blocks in the array. For example, FIG. 4 illustrates programmable IC 400 that includes a large number of different programmable tiles including multi-gigabit transceivers (MGTs) 401, configurable logic blocks (CLBs) 402, random access memory blocks (BRAMs) 403, input/output blocks (IOBs) 404, configuration and clocking logic (CONFIG/CLOCKS) 405, digital signal processing blocks (DSPs) 406, specialized input/output blocks (I/O) 407, for example, clock ports, and other programmable logic 408 such as digital clock managers, analog-to-digital converters, system monitoring logic, and so forth. Some programmable IC having FPGA logic also include dedicated processor blocks (PROC) 410 and internal and external reconfiguration ports (not shown).

In some FPGA logic, each programmable tile includes a programmable interconnect element (INT) 411 having standardized connections to and from a corresponding interconnect element in each adjacent tile. Therefore, the programmable interconnect elements taken together implement the programmable interconnect structure for the illustrated FPGA logic. The programmable interconnect element INT 411 also includes the connections to and from the programmable logic element within the same tile, as shown by the examples included at the top of FIG. 4.

For example, a CLB 402 can include a configurable logic element CLE 412 that can be programmed to implement user logic, plus a single programmable interconnect element INT 411. A BRAM 403 can include a BRAM logic element (BRL) 413 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 406 can include a DSP logic element (DSPL) 414 in addition to an appropriate number of programmable interconnect elements. An 10B 404 can include, for example, two instances of an input/output logic element (IOL) 415 in addition to one instance of the programmable interconnect element INT 411. As will be clear to those of skill in the art, the actual I/O bond pads connected, for example, to the I/O logic element 415, are manufactured using metal layered above the various illustrated logic blocks, and typically are not confined to the area of the input/output logic element 415.

A columnar area near the center of the die (shown shaded in FIG. 4) is used for configuration, clock, and other control logic. Horizontal areas 409 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 4 include additional logic blocks that disrupt the regular columnar structure making up a large part of the programmable IC. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual programmable IC, more than one adjacent column of CLBs is typically included wherever the CLBs appear, to facilitate the efficient implementation of user logic.

Figure 5:
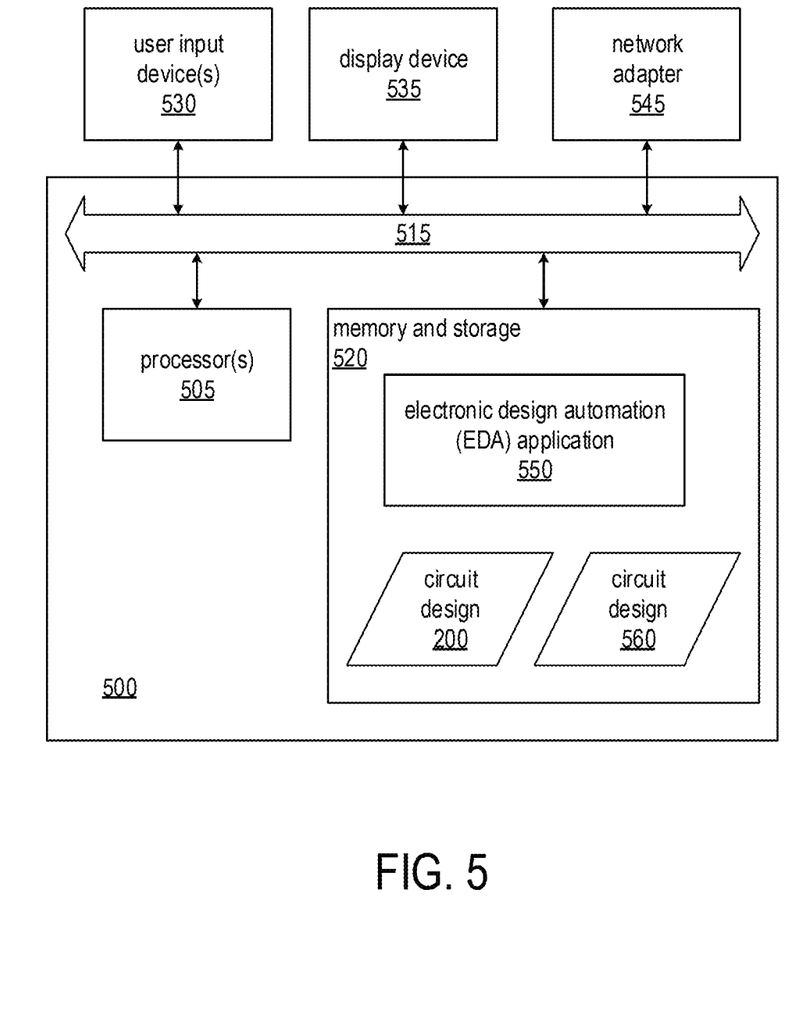
FIG. 5 is a block diagram illustrating an exemplary data processing system.

FIG. 5 is a block diagram illustrating an exemplary data processing system (system) 500. System 500 is an example of an EDA system. As pictured, system 500 includes at least one processor circuit (or "processor"), e.g., a central processing unit (CPU) 505 coupled to memory and storage arrangement 520 through a system bus 515 or other suitable circuitry. System 500 stores program code and circuit design 200 within memory and storage arrangement 520. Processor 505 executes the program code accessed from the memory and storage arrangement 520 via system bus 515. In one aspect, system 500 is implemented as a computer or other data processing system that is suitable for storing and/or executing program code. It should be appreciated, however, that system 500 can be implemented in the form of any system including a processor and memory that is capable of performing the functions described within this disclosure.

Memory and storage arrangement 520 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 500 may also include one or more cache memories (not shown) that provide temporary storage of at least some program code and data in order to reduce the number of times program code and data must be retrieved from local memory and persistent storage during execution.

Input/output (I/O) devices such as user input device(s) 530 and a display device 535 may be optionally coupled to system 500. The I/O devices may be coupled to system 500 either directly or through intervening I/O controllers. A network adapter 545 also can be coupled to system 500 in order to couple system 500 to other systems, computer systems, remote printers, and/or remote storage devices through intervening private or public networks. Modems, cable modems, Ethernet cards, and wireless transceivers are examples of different types of network adapter 545 that can be used with system 500.

Memory and storage arrangement 520 may store an electronic design automation (EDA) application 550. EDA application 550, being implemented in the form of executable program code, includes various circuit design tools and is executed by processor(s) 505. As such, EDA application 550 specifically programs processor 505 and is considered part of system 500. System 500, while executing EDA application 550, receives and operates on circuit design 200. In one aspect, system 500 performs a design flow on circuit design 200, and the design flow may include synthesis, mapping, placement, routing, and the automated insertion of pipeline registers on data paths and associated handshake paths as described herein. System 500 generates a modified version of circuit design 200 as circuit design 560.

EDA application 550, circuit design 200, circuit design 560, and any data items used, generated, and/or operated upon by EDA application 550 are functional data structures that impart functionality when employed as part of system 500 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for automatically resolving timing violations in circuit designs. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method, comprising:
   inputting to a programmed processor, a hardware description language (HDL) specification of a circuit design having:
   a first compiler directive associated with signal names of payload data signals and that specifies a first group name and a pipeline limit,
   a second compiler directive associated with a signal name of a forward handshake signal and that specifies the first group name, the pipeline limit, and a reference to a second group name, and a third compiler directive associated with a response handshake signal name and that specifies the second group name;

placing elements of the circuit design on a target integrated circuit (IC) and performing timing analysis by the programmed processor;

inserting by the programmed processor, in response to the timing analysis indicating one signal of the payload data signals, forward handshake signal, or response handshake signal is timing-critical and in response to the first group name associating the payload data signals and forward handshake signal and the second group name referencing the response handshake signal, equal numbers of one or more pipeline registers on paths of the payload data signals, forward handshake signal, and response handshake signal, and limiting a total of the equal numbers of pipeline registers to the pipeline limit on paths of the forward handshake signal and response handshake signal;

generating data that implements the circuit design; and configuring the IC with the data that implements the circuit design.

2. The method of claim of claim 1, wherein:

the circuit design includes a module that specifies the payload data signals carried on one or mom data signal paths, respectively, and that specifies the forward handshake signal and the response handshake signal carried on handshake paths, respectively;

the module specifies on each data signal path an input register and an output register;

the module specifies on each handshake path an input register and an output register; and the inserting includes inserting equal numbers of one or more pipeline registers between the input register and the output register on each of the one or more data signal paths and between the input register and the output register on handshake path of the forward handshake signal.

3. The method of claim 1, further comprising:

placing the equal numbers of one or more pipeline registers on the target IC;

routing the circuit design;

performing timing analysis of the circuit design by the programmed processor after the placing and the routing; and removing one or more of the equal numbers of one or more pipeline registers from the paths of the payload data signals, forward handshake signal, and response handshake signal in response to the paths of the two or more signals having positive hold slack.

4. The method of claim 3, further comprising:

performing physical synthesis of the circuit design after the removing the one or more pipeline registers;

during the physical synthesis, performing timing analysis of the circuit design by the programmed processor; and removing one or more pipeline registers of the equal numbers of one or more pipeline registers from the paths of the payload data signals, forward handshake signal, and response handshake signal in response to the paths of the two or more signals having positive hold slack.

5. The method of claim 1, wherein:

the placing elements of the circuit design includes assigning the elements to regions of the target IC;

the inserting the equal numbers of one or more pipeline registers is performed after the assigning elements to regions; and the method further includes placing the elements and the equal numbers of one or more pipeline registers to particular resources of the target IC.

6. The method of claim 1, wherein:

the placing elements of the circuit design includes assigning the elements to regions of the target IC;

the inserting the equal numbers of one or more pipeline registers is performed after the assigning elements to regions;

assigning the equal numbers of one or more pipeline registers to regions of the target IC; and spreading the equal numbers of one or more pipeline registers across regions of the target IC.

7. A system, comprising:

a computer processor;

a memory coupled to the computer processor, wherein the memory is configured with instructions that when executed cause the computer processor to perform operations including:

inputting a hardware description language (HDL) specification of a circuit design having:

a first compiler directive associated with signal names of payload data signals and that specifies a first group name and a pipeline limit, a second compiler directive associated with a signal name of a forward handshake signal and that specifies the first group name, the pipeline limit, and a reference to a second group name, and a third compiler directive associated with a response handshake signal name and that specifies the second group name;

placing elements of the circuit design on a target integrated circuit (IC) and performing timing analysis by the programmed processor;

inserting, in response to the timing analysis indicating one signal of the payload data signals, forward handshake signal, or response handshake signal is timing-critical and in response to the first group name associating the payload data signals and forward handshake signal and the second group name referencing the response handshake signal, equal numbers of one or more pipeline registers on paths of the payload data signals, forward handshake signal, and response handshake signal, and limiting a total of the equal numbers of pipeline registers to the pipeline limit on paths of the forward handshake signal and response handshake signal;

generating data that implements the circuit design; and configuring the IC with the data that implements the circuit design.

8. The system of claim of claim 7, wherein:

the circuit design includes a module that specifies the payload data signals carried on one or mom data signal paths, respectively, and that specifies the forward handshake signal and the response handshake signal carried on handshake paths, respectively;

the module specifies on each data signal path an input register and an output register;

the module specifies on each handshake path an input register and an output register; and the instruction for inserting includes instructions for inserting equal numbers of one or more pipeline registers between the input register and the output register on each of the one or more data signal paths and between the input register and the output register on handshake path of the forward handshake signal.

9. The system of claim 7, wherein the memory is further configured with instructions that cause the computer processor to perform operations of:
- placing the equal numbers of one or more pipeline registers on the target IC;
- routing the circuit design;
- performing timing analysis of the circuit design after the placing and the routing; and
- removing one or more of the equal numbers of one or more pipeline registers from the paths of the payload data signals, forward handshake signal, and response handshake signal in response to the paths of the two or more signals having positive hold slack.

10. The system of claim 9, wherein the memory is further configured with instructions that cause the computer processor to perform operations of:
- performing physical synthesis of the circuit design after the removing the one or more pipeline registers;
- during the physical synthesis, performing timing analysis of the circuit design; and
- removing one or more pipeline registers of the equal numbers of one or more pipeline registers from the paths of the payload data signals, forward handshake signal, and response handshake signal in response to the paths of the two or more signals having positive hold slack.

11. The system of claim 7, wherein:
the instructions for placing elements of the circuit design include instructions for assigning the elements to regions of the target IC;
the inserting the equal numbers of one or more pipeline registers is performed after the assigning elements to regions; and
the memory is further configured with instructions that cause the computer processor to perform the operation of placing the elements and the equal numbers of one or more pipeline registers to particular resources of the target IC.

* * * * *